United States Patent [19]
Persinos

[11] 3,723,410
[45] Mar. 27, 1973

[54] METHOD OF PRODUCING STEVIOSIDE
[75] Inventor: Georgia J. Persinos, Rockville, Md.
[73] Assignee: The Amazon Natural Drug Company, Somerville, N.J.
[22] Filed: Dec. 1, 1970
[21] Appl. No.: 94,628

[52] U.S. Cl. ............................................. 260/210 R
[51] Int. Cl. ............................................... C07c 47/18
[58] Field of Search ................................. 260/210 R

[56] References Cited

OTHER PUBLICATIONS

Wood, Jr. et al. "Chem. Abst." Vol. 50, 1956 p. 5581(e)
Vis et al. "Chem. Abst." Vol. 51, 1957 pp. 2660f–2661(a).

Primary Examiner—Lewis Gotts
Assistant Examiner—Johnnie R. Brown
Attorney—Francis D. Stephens and Hugo H. Huettig

[57] ABSTRACT

A new and improved method for the extraction of stevioside from the leaves of *Stevia rebaudiana* in which the leaves are ground, defatted, treated with an organic extractant, filtered, the resultant filtrate reduced to a syrup, and the syrup thereafter treated by one or more steps to form crystals of stevioside.

9 Claims, No Drawings

METHOD OF PRODUCING STEVIOSIDE

BACKGROUND OF INVENTION

Stevioside is a compound that is 300 times as sweet as sugar and has been found to be non—toxic. This property, in the light of the present day activity toward the production of a sugar substitute, has resulted in considerable interest being shown in the compound and its production on a commercial basis.

Stevioside possesses the empirical formula $C_{38}H_{60}O_{18}$ [1]([1]Bridel, M. and R. Lavielle. 1931. Le principe saveur sucree du kaa-he-e (*Stevia rebaudiana* Bertoni). *Bull. Soc. Chim. Biol.*) and has the following structural formula E. and H. G. Fletcher, Jr. 1956. Stevioside. IV. Evidence that stevioside is a sophoroside. *J. Am. Chem. Soc.* 78:4709–4710.):

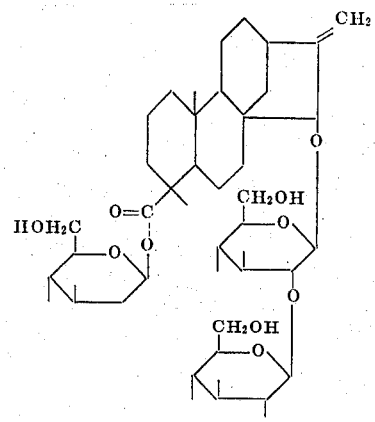

Stevioside is a light, colorless and odorless powder consisting of long, silky needles arranged in tufts and in its pure form has a melting point of 196°–198° C. Stevioside on standing will rapidly absorb moisture, with the moisture content varying with the atmospheric humidity. The compound is relatively insoluble in water with the crystalline hydrate form obtained from an aqueous solution thereof losing its water of crystallization on standing in air. The compound has varying degrees of solubility in various organic solvents.

Stevioside heretofore has been obtained by extracting the compound from the leaves of *Stevia rebaudiana* Bertoni (Compositae) in various ways. An excellent study of the compound, its properties and known methods of production are given in the following articles:

1. Journal of Organic Chemistry
   Stevioside I. The Structure Of The Glucose Moieties.
   Harry B. Wood et al.
   Vol. 20, July 1955 — Pages 884–889
2. Journal Of Organic Chemistry
   Stevioside II. The Structure Of The Aglucon.
   Eric Mossetig et al.
   Vol. 20, July 1955 — Pages 875–883

A procedure for extracting stevioside from the leaves of *Stevia rebaudiana* that has been employed heretofore may be identified as the ion exchange method. An actual example of this procedure is given as follows:

ION EXCHANGE METHOD

Two hundred Gm. of air-dried and coarsely ground leaves and stems of *Stevia rebaudiana* were mixed with 10 Gm. of powdered calcium carbonate, and this mixture then combined with 1,200 ml. of distilled water. The resulting mixture was thereafter extracted in a pharmaceutical percolator at room temperature for about 20 hours. After removal of the water by draining, the residue was washed with 300 ml. of distilled water and the excess water removed by pressure. The mass was then combined with 600 ml. of distilled water, stirred and re-pressed. The latter process was repeated two more times and the combined filtrates and pressings stirred with Amberlite IR-120, a synthetic ion exchange resin marketed by Rohn & Haas of Philadelphia The precipitate formed by this treatment, together with the resin, is removed by filtration on a bed of Hyflo Super Cel, a diatomaceous earth filler aid marketed by Johns-Manville Corp. of New York, N. Y. The filtrate was thereafter de-ionized by successively passing through the filtrate columns of 45 × 800 mm. Amberlite IR-12- and Duolite A-4, two ion exchange resins. The effluent was thereafter concentrated in vacuo at 45°–50° C to a honey-like syrup. This syrup was dissolved in 175 ml. of methanol and left at +5° C over night. Upon the completion of this treatment, crude crystalline stevioside was collected. The crystals were washed with 50 ml. of methanol and dried at 40° C. The yield of crude stevioside under these extraction conditions was approximately 20.2 Gm.

The crude stevioside was a greenish-solid which was subjected to further treatment by extraction with four parts of boiling dioxane, and the residue was removed by filtration on a bed of Hyflo Super Cel filter aid. Addition of one part of methanol to the filtrate initiated crystallization, and after the mixture had remained at room temperature over night, pure stevioside was deposited in crystalline form. The yield from 20.2 Gm. of crude stevioside was approximately 14 Gm. and was found to have a melting point of 198°–202° C. Further crystallization with dioxane-methanol mixture with very little loss of stevioside produced, after drying at 100° C in vacuo, pure stevioside having a melting point of 196°–198° C.

SUMMARY OF THE INVENTION

The method of producing stevioside in accordance with the present invention is carried out by grinding the leaves of the *Stevia rebaudiana* Bertoni (Compositae) plant to a coarsely milled state. The milled leaf mixture is thereafter subjected to an initial defatting treatment to defat the plant material prior to any subsequent extracting treatment. The defatting may be carried out by boiling the ground plant material mixture with an organic extraction solvent for the plant fat, the solvent employed being one in which stevioside is substantially insoluble, for a period of time sufficient to effectively defat the plant material. An illustrative example of a suitable organic solvent is chloroform in which the ground plant mixture may be treated on a continuous basis for a period of time sufficient to achieve the desired defatting. The cycling of the organic solvent may be carried out for up to 150 hours or more, or the cycling may be continued until the fresh extractive solvent is no more than a pale yellow color. The defatting of the ground mixture may be carried out in a Soxhlet extraction apparatus or a Lloyd-type extractor, both of which operate on a continuous basis.

After the ground leaf mixture has been defatted, the resulting mixture is then air-dried for a suitable period of time and then mixed with a base material, such as, for example, calcium carbonate, to render the ground mixture basic when same is placed in a liquid suspension. The ground mixture combined with the basic compound is to be subjected to further extractive treatment to effect the removal of stevioside from the ground leaf mass. This extractive step may be carried out in one of two ways.

In the preferred manner, the calcium carbonate-ground leaf mixture is combined with a suitable organic solvent for stevioside, such as, for example, dioxane, and the mixture heated to boiling while continuously stirring the mass for a period of time necessary to effect the dissolving out of the stevioside from the leaf mixture. A suitable period of contact time will be found to be in the range of 1 to 3 hours. The mixture is thereafter filtered through suitable filtering equipment, such as, for example, a Büchner funnel, to produce the desired filtrate. The plant material remaining on the filter may be treated with subsequent and successive washings of the boiling organic solvent, i.e., dioxane, to insure substantially complete removal of the stevioside from the plant material. The total filtrates are thereafter combined and are reduced to a syrup in vacuo at a temperature in the range 40°–60° C.

In an alternative procedure, the basic ground mixture is moistened with distilled water and packed in a pharmaceutical percolator and subjected to a percolation operation carried out at a moderate rate of percolation, with distilled water being added as needed. The resulting percolate is then frozen and lyophilized, and is thereafter ready for subsequent treatment. The lyophilized powder is added to an organic solvent for stevioside, such as, for example, dioxane, and the suspension heated on a steam bath for a period of time sufficient to effect the extraction of stevioside from the mixture, such as, for example, a period of time from one-half to 2 hours. The hot mixture is then filtered through a Buchner funnel to produce a filtrate, with the filtrate thereafter being reduced in volume in vacuo at 40°–60° C to a syrup-like slate. This concentrated solution or syrup is then to be subjected to a final extraction step to produce the desired stevioside.

To this concentrated solution or syrup produced by either of the above procedures an aliphatic alcohol in which stevioside is soluble, such as, for example, methanol, is added and the syrup mixture permitted to stand at approximately room temperature for 24 hours. Crude crystals of stevioside were formed and removed by filtration. The mother liquor is thereafter reduced to dryness in vacuo using a rotating evaporator at a suitable temperature, such as, for example, 40°–60° C. A small amount of organic solvent, i.e., dioxane, is added to the dried material and thereafter heated to boiling in a steam bath until a solution is achieved. The volume of the solution is again reduced in vacuo at 40°–60° C on a rotating evaporator and the resulting reduced solution then combined with methanol or like aliphatic alcohol, and the solution allowed to stand at room temperature for 24 hours. The crystals that formed over night are removed from the mixture by a filtration and the mother liquor subjected to the same procedure by successive steps until no further crystals are formed. The crop of crystals produced were substantially pure stevioside. If desired, successive and alternating treatment of the filtrate with methanol and dioxane washing may be carried out to insure complete obtainment of stevioside.

In the foregoing description of the invention, the materials to be employed are illustrative in character only. The specific material disclosed is preferred by reason of ready availability and cheapness of cost. However, it is to be understood that other compounds satisfying the requirements noted may be used. Similarly, the amount of the materials to be employed likewise will vary. In general, the proportions employed will be necessary to achieve the desired solubilizing and extracting of the desired material. The processing conditions also will be found to vary, depending upon the state of the raw material and the time requirements for carrying out the extraction steps.

DESCRIPTION OF SPECIFIC AND ILLUSTRATIVE EMBODIMENTS.

Reference is now to be had to the following illustrative embodiments of processes made in accordance with the present invention:

EXAMPLE I 8.0 kg of coarsely milled leaves of *Stevia rebaudiana* Bertoni (Compositae) were continuously extracted with chloroform as a solvent in a Lloyd-type extractor to defat the mixture. The cycling of solvent was continued until the fresh chloroform extractive was no more than a pale yellow color. After this treatment the ground plant material was removed from the extractor and air-dried.

400 g of calcium carbonate powder and 32 liters of dioxane were thereafter added to the dried ground leaf material. This mixture was heated to boiling with continuous stirring and was maintained in this state for 2 hours. The mixture was then filtered through a Büchner funnel, with the plant material remaining on the filter pad being washed with an additional 8 liters of boiling dioxane. This procedure was repeated three times and the three dioxane filtrates were combined and reduced to a syrup in vacuo at 50° C. An equal volume of methanol was then added to the syrup and the resulting solution was set aside over night to allow crystallization to proceed.

The crystals were formed over night and were collected using a Büchner funnel, and washed thoroughly with ice cold methanol. The mother liquor, together with the methanol washings, were reduced to a syrup in vacuo at 50° C, and an equal volume of methanol was again added, and the mixture set aside over night to crystallize. The crystals formed were removed by filtration using a Büchner funnel and the resulting crystals were washed with ice cold methanol. Both crops of crystals were combined, dissolved in three liters of boiling dioxane, filtered, and the solution was brought to room temperature (25°–27° C). An equal volume of methanol was added and the solution was set aside over night. Crystals that formed were removed by filtration using a Büchner funnel and the crystals were washed with ice cold methanol. The crystals were dried in vacuo at 100° C and weighed. The yield from 8.0 kg of air-dried Stevia rebaudiana leaves was 520 g (6.5 percent) of stevioside. Additional stevioside can be obtained from the mother liquors obtained above.

EXAMPLE II

One kilo of dried, coarsely ground leaves of *Stevia rebaudiana* Bertoni (Compositae) was extracted continuously with boiling chloroform in a Soxhlet apparatus for 150 hours. The plant material was then air-dried, mixed with 50 Gm of calcium carbonate, moistened with distilled water, and packed into a pharmaceutical percolator. After 1 hour the percolate was collected at a moderate rate. Enough distilled water was added so that 6.0 L of percolate was collected. The percolate was then frozen and lyophilized.

To each 100 Gm of lyophilized powder was added 800 ml of dioxane and this was heated on a steam bath (100° C) for 1 hour. The hot mixture was filtered through a Buchner funnel. This procedure was repeated twice and the filtrates were combined and reduced to a volume of 100 ml in vacuo at 40° C.

To this concentrated solution was added 100 ml of methanol and the solution was allowed to stand at 25°–27° C for 24 hours. The crystals of crude stevioside that formed were then removed by filtration using a Buchner funnel, and washed with cold methanol.

The mother liquor was reduced to dryness in vacuo using a rotating evaporator at 40° C. A minimum amount of dioxane was added and heated to boiling on a steam bath until solution was effected. The volume was reduced to 75 ml in vacuo at 40° C on a rotating evaporator. The solution was transferred to a beaker, 75 ml of methanol was added, and the solution allowed to stand at room temperature for 24 hours. The crystals that formed were removed by filtration, and the procedure was repeated as above until no more stevioside was formed.

I claim:

1. The method of producing stevioside which comprises grinding the leaves of the *Stevia rebaudiana* Bertoni plant, contacting the ground leaves with a solvent for the plant fat material for a period of time sufficient to effect a defatting of the plant material, combining the defatted mixture with a basic compound to effect a neutralization thereof, contacting the basic defatted mixture with an organic solvent for stevioside and thereafter heating the mixture at an elevated temperature and for a period of time sufficient to extract and place the stevioside in solution, filtering the mixture to produce a filtrate, heating the filtrate to a reduced volume, combining the reduced filtrate with a lower alkyl alcohol and allowing the resulting filtrate mixture to stand for a period of time sufficient for the formation of crystals, and separating the stevioside in crystal form from the mixture.

2. A method in accordance with claim 1, wherein the treated basic mixture residue remaining from the initial filtering step is washed at least one more time with a boiling organic solvent and the filtrate from each washing is combined with the initial filtrate prior to reducing the volume thereof.

3. A method in accordance with claim 1, wherein the mother liquor remaining after the stevioside crystals have been removed is reduced to a syrup by heating, combined with a lower alkyl alcohol and thereafter allowed to set for a period of time sufficient to permit crystals to form, the crystals are then removed and the mother liquor is subjected to a repeat of the same treatment at least one more time.

4. A method in accordance with claim 3, wherein all of the crystals of stevioside are combined with one another and then dissolved in a boiling organic solvent for stevioside, the filtrate thereafter cooled to room temperature, a lower alkyl alcohol is then added to the filtrate, the solution allowed to settle for a period of time sufficient to form crystals, and the formed crystals are removed as stevioside.

5. A method in accordance with claim 1, wherein the defatted mixture is combined with a basic compound to effect a neutralization thereof and an organic solvent for stevioside, and the mixture is thereafter boiled for a period of time sufficient to extract the stevioside, and the mixture then filtered to produce a filtrate.

6. A method in accordance with claim 1, wherein the defatted mixture is combined with a basic compound to effect a neutralization thereof, thereafter subjecting the mixture to a pharmaceutical percolation in the presence of distilled water to produce a percolate, freezing the percolate and lyophilizing the frozen percolate to constitute the material to be combined with the organic solvent.

7. A method in accordance with claim 6, wherein mother liquor remaining after the stevioside crystals have been removed is reduced to a syrup by heating, combined with a lower alkyl alcohol and allowed to set for a period of time sufficient to permit crystals to form, the crystals are removed and the mother liquor is subjected to a repeat of the same treatment at least one more time.

8. A method in accordance with claim 7, wherein all of the crystals of stevioside are combined with one another and dissolved in a boiling organic solvent for stevioside, thereafter filtered and the filtrate cooled to room temperature, a lower alkyl alcohol is added to the filtrate, the solution permitted to settle for a period of time sufficient to form crystals, and the formed crystals are removed as stevioside.

9. A method in accordance with claim 1, wherein the defatting agent is chloroform, the basic compound in calcium carbonate, the organic solvent is dioxane, and the lower alkyl alcohol is methanol.

* * * * *